(12) United States Patent
Hu et al.

(10) Patent No.: US 10,237,158 B2
(45) Date of Patent: Mar. 19, 2019

(54) BROADCAST INTERCEPTION METHOD AND APPARATUS OF INTELLIGENT DEVICE

(71) Applicant: BEIJING QIHOO TECHNOLOGY COMPANY LIMITED, Beijing (CN)

(72) Inventors: Zhong Hu, Beijing (CN); Xin Wang, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 312 days.

(21) Appl. No.: 15/036,706

(22) PCT Filed: Aug. 26, 2014

(86) PCT No.: PCT/CN2014/085189
§ 371 (c)(1),
(2) Date: May 13, 2016

(87) PCT Pub. No.: WO2015/070655
PCT Pub. Date: May 21, 2015

(65) Prior Publication Data
US 2016/0323170 A1    Nov. 3, 2016

(30) Foreign Application Priority Data
Nov. 15, 2013    (CN) .......................... 2013 1 0573881

(51) Int. Cl.
*G06F 9/46*    (2006.01)
*H04L 12/26*    (2006.01)
*H04L 12/18*    (2006.01)

(52) U.S. Cl.
CPC .......... *H04L 43/10* (2013.01); *H04L 12/1886* (2013.01); *H04L 43/04* (2013.01)

(58) Field of Classification Search
None
See application file for complete search history.

(56) References Cited

U.S. PATENT DOCUMENTS 9,736,166 B2 *    8/2017    Riva ..................... H04L 63/102

FOREIGN PATENT DOCUMENTS

| CN | 102428688 A | 4/2012 |
| CN | 103368914 A | 10/2013 |
| CN | 103595547 A | 2/2014 |

* cited by examiner

*Primary Examiner* — Gregory A Kessler
(74) *Attorney, Agent, or Firm* — Baker & Hostetler LLP

(57) ABSTRACT

Disclosed are broadcast interception method and apparatus of intelligent device. The broadcast interception method comprises: in a framework layer, acquiring a broadcast that a broadcast center needs to send to a broadcast receiver of an application; determining a broadcast type of the broadcast according to information contained in the broadcast; determining, according to the broadcast type and broadcast subscription information, identifier information of the application that needs to receive the broadcast; and when it is determined that the identifier information of the application matches preset identifier information of an application in a broadcast interception information set and the broadcast type of the broadcast matches a broadcast filtering type preset for the application, prohibiting sending the broadcast to the broadcast receiver of the application; otherwise, allowing sending the broadcast to the broadcast receiver of the application.

20 Claims, 4 Drawing Sheets

BROADCAST INTERCEPTION METHOD AND APPARATUS OF INTELLIGENT DEVICE

CROSS-REFERENCE TO RELATED APPLICATIONS

This application is the national stage of international Application No. PCT/CN2014/085189 filed Aug. 26, 2014, which is based upon and claims priority to Chinese Patent Application No. CN201310573881.1, filed Nov. 15, 2013, the entire contents of which are incorporated herein by reference.

FIELD OF TECHNOLOGY

The disclosure relates to broadcast techniques for intelligent device, and in particular to a broadcast interception method and apparatus of intelligent device.

BACKGROUND

In an intelligent device (especially, an intelligent mobile device) using Android as an operating system, some applications (also referred to as the third part applications or application programs) may automatically execute operations backstage, in accordance with a corresponding type of broadcast received from the operating system, without being known by the user. In a specific example, after an intelligent mobile device starts up or successfully accesses to a network, a broadcast center (for example, ActivityManagerService) in a framework (Framework) layer of its operating system may send a broadcast of startup type or a broadcast of network connection type to a broadcast receiver of a relevant application, and upon the receipt of the broadcast of startup type or network connection type, the relevant application may automatically execute a startup operation backstage so as to be in an operating state.

The operation automatically executed backstage after the application receives the broadcast may possibly bring adverse effects to the intelligent device. For example, the self-starting application may occupy resources such as processing and buffer of the intelligent mobile device, which may cause the property of the intelligent mobile device to be deteriorated or even may interfere with normal operations of other applications in the intelligent mobile device. As another example, a malicious application may execute some malicious operations upon the receipt of the corresponding type of broadcast, which may cause adverse effects on the security of the intelligent mobile device. In addition, the self-starting applications may shorten the service time of the intelligent mobile device.

In order to avoid the adverse effects on an intelligent device due to operations automatically executed backstage after an application receives a broadcast, broadcast interception should be made to relevant applications. Usually, in the current broadcast interception manner, broadcast receivers of the relevant applications are subjected to a setting of disabling component, such that each of broadcast receivers that a broadcast center faces is a broadcast receiver without the setting of disabling component, and thus the relevant applications will no longer receive a broadcast from the broadcast center via a broadcast receiver with the setting of disabling component.

The inventors have found in the implementation of the disclosure, applications may possibly need to receive broadcasts during their normal operations; if a broadcast receiver of an application is subjected to the setting of disabling component, the application will no longer receive any types of broadcasts from the broadcast center through the broadcast receiver. Therefore, the current broadcast interception manner may interfere with the normal operation of the application. For example, the application is unable to normally start up or complete a certain function. In addition, the setting of disabling component often needs to have a higher setting privilege. For example, only when a security management application has a Root privilege, the broadcast receiver of the relevant application can be set to the component disabled state. However, the security management application having higher setting privilege may cause some adverse effects. For example, a risk that malicious program (such as, Trojan virus program) in an intelligent device obtains Root privilege of the intelligent device is increased, thereby influencing the security of the intelligent device. Moreover, failures due to the higher setting privilege are often excluded from the warranty of after-sale service of the intelligent device.

SUMMARY

In the view of above problems, the disclosure are proposed to provide a broadcast interception method for intelligent device and a corresponding broadcast interception apparatus for intelligent device, for overcoming or at least partially solving above problems.

According to one aspect, there is provided a broadcast interception method for intelligent device, comprising steps of:

in a framework layer, acquiring a broadcast that a broadcast center needs to send to a broadcast receiver of an application;

determining a broadcast type of the broadcast according to information contained in the broadcast;

determining, according to the determined broadcast type and broadcast subscription information, identifier information of the application that needs to receive the broadcast; and if it is determined that the identifier information of the application matches preset identifier information of the application in a broadcast interception information set and the determined broadcast type of the broadcast matches broadcast filtering type preset for the application, prohibiting sending the broadcast to the broadcast receiver of the application, otherwise, allowing sending the broadcast to the broadcast receiver of the application.

According to another one aspect, there is provided a broadcast interception apparatus for intelligent device, comprising:

an acquisition module located in a framework layer, configured to acquire a broadcast that a broadcast center needs to send to a broadcast receiver of an application;

a first determination module located in the framework layer, configured to determine a broadcast type of the broadcast according to information contained in the broadcast;

a second determination module located in the framework layer, configured to determine, according to the broadcast type and broadcast subscription information, identifier information of the application that needs to receive the broadcast; and an interception processing module located in the framework layer, if it is determined that the identifier information of the application matches preset identifier information of the application in a broadcast interception information set and the broadcast type of the broadcast matches a broadcast filtering type preset for the application, prohibit sending the broadcast to the broadcast receiver of application, otherwise allowing sending the broadcast to the broadcast receiver of application.

The method and broadcast interception apparatus for intelligent device according to the disclosure may perform matching operations of the identifier information of application and the broadcast type after determining the broadcast type of a broadcast that needs to send to the broadcast receiver of application and the identifier information of the application that needs to receive the broadcast. In such a manner, the broadcast interception for corresponding broadcast types can be made to the relevant application according to the matching result. In other words, the disclosure may directionally complete the broadcast interception in the process of sending the broadcast to the broadcast receiver of application. Therefore, the disclosure may avoid that some applications execute the self-starting operation backstage without being known by the user, and in the meanwhile, avoid adverse effects on the normal operations of the application due to disabled settings to the broadcast receiver component. Further, the disclosure may also avoid adverse effects on the security and the after-sale service of the intelligent device due to the higher setting privilege.

Described above is merely an overview of the inventive scheme. In order to more apparently understand the technical means of the disclosure to implement in accordance with the contents of specification, and to more readily understand above and other objectives, features and advantages of the disclosure, specific embodiments of the disclosure are provided hereinafter.

BRIEF DESCRIPTION OF THE DRAWINGS

Through reading the detailed description of the following preferred embodiments, various other advantages and benefits will become apparent to an ordinary person skilled in the art. Accompanying drawings are merely included for the purpose of illustrating the preferred embodiments and should not be considered as limiting of the invention. Further, throughout the drawings, same elements are indicated by same reference numbers. In the drawings.

DESCRIPTION OF THE EMBODIMENTS

Exemplary embodiments of the disclosure will be described in detail with reference to the accompanying figures hereinafter. Although the exemplary embodiments of the disclosure are illustrated in the accompanying figures, it should be understood that the disclosure may be embodied in many different forms and should not be construed as being limited to the embodiments set forth herein. Rather, these embodiments are provided so that this disclosure will be understood thoroughly and completely and will fully convey the scope of the disclosure to those skilled in the art.

The first embodiment is directed to a broadcast interception method for intelligent device. Hereinafter the method according to this embodiment will be described with reference to FIG. 1.

Figure 1:
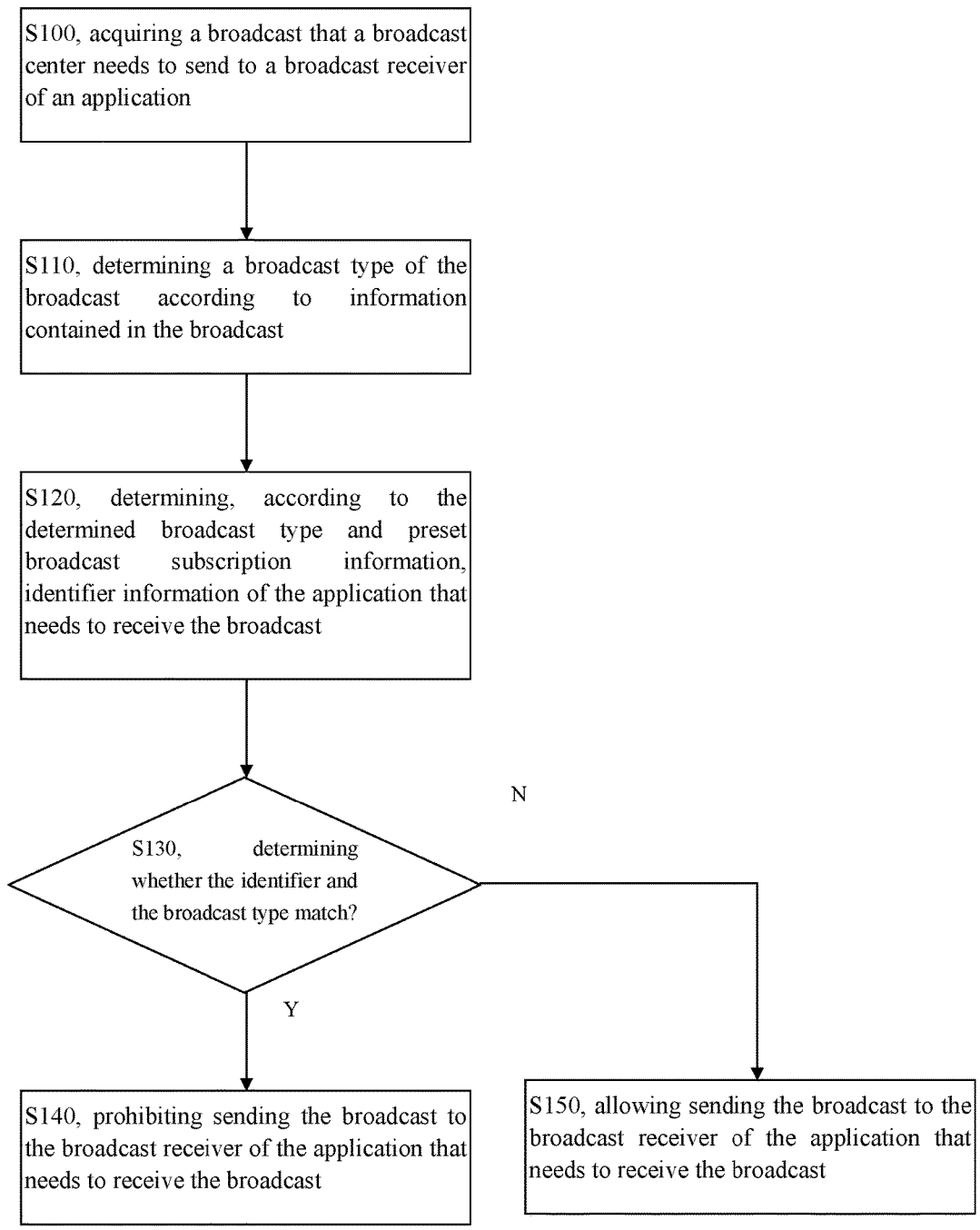
FIG. 1 illustrates a flow chart of a broadcast interception method for intelligent device according to a first embodiment of the disclosure.

In FIG. 1, S100, in a framework (Framework) layer, acquiring a broadcast that a broadcast center needs to send to a broadcast receiver of an application.

In particular, the intelligent device in this embodiment could be an intelligent device based on Android operating system. Of course, if there is another operating system having a similar structure to that of Android operating system, then the intelligent device in this embodiment could also be the intelligent device based on this operating system having the similar structure. Hereinafter the disclosure will be explained by way of Android operating system.

In the intelligent device based on Android, the application at the application layer register the broadcast receiver at the framework layer by subscribing for messages in accordance with its specific demand. When the application registers the broadcast receiver, broadcast subscription information may be generated. The broadcast subscription information may be stored in the framework layer and should contain identifier information of application (also referred to as identifier information of broadcast receiver of application) and a broadcast type, for example. As such, the framework layer may send the respective type of broadcast to the respective broadcast receiver of application in accordance with the broadcast subscription information.

The broadcast receiver registered by the application generally may receive broadcasts of various broadcast types and could be a static broadcast receiver or a dynamic broadcast receiver. In addition, above identifier information of application may be a package name (i.e., package identifier) of application, and above broadcast type could be a startup type or a network connection type.

When the intelligent device is executing relevant operations (such as, startup operation or network connection operation), its operating system may generate a broadcast of the corresponding broadcast type (such as, a broadcast of startup type or a broadcast of network connection type), so as to inform the corresponding application of the operation being executed by the intelligent device, such that the application may execute relevant operation (such as, self-starting operation) in response to the received broadcast.

The broadcast center in this embodiment generally refers to a platform which is used to buffer broadcasts in queue and finally send the broadcasts buffered in queue to respective broadcast receivers of application. In the operating system based on the Android, the broadcast center may be achieved by AMS (ActivityManagerService).

In the view of the broadcast receiver, all the parsed dynamic broadcast receivers and static broadcast receivers are stored in the AMS. In the view of the broadcast sending, the broadcasts sent by a function SendBroadcast( ) or SendOrderedBroadcast( ) are actually finally invoked to the AMS and stored in queue in the AMS to wait for processing each broadcast by the AMS. The AMS may process the broadcasts stored in queue one by one, so that the broadcasts may finally be sent to the respective broadcast receivers.

In this embodiment, the operation of acquiring the broadcast may be executed by the broadcast center. For example, a processing next broadcast function (i.e., ProcessNextBroadCast( ) function) in the AMS may extract a piece of broadcast from a broadcast queue (BroadCastQueue) of the broadcast center. The extracted piece of broadcast is the aforesaid broadcast that needs to send to the broadcast receiver of the application.

S110, determining a broadcast type of the broadcast according to information contained in the broadcast.

In particular, since the broadcast generally contains information in relation to a broadcast type, the broadcast type of this broadcast may be correctly determined by the information contained in the broadcast. The operation of determining the broadcast type at this step may be executed by the broadcast center. For example, the ProcessNextBroadCast( ) function in the AMS may determine the broadcast type of this broadcast in accordance with the information contained in the broadcast extracted from the broadcast queue.

S120, determining, according to the determined broadcast type and preset broadcast subscription information, identifier information of the application that needs to receive the broadcast.

In particular, for one piece of broadcast, one or more application needs to receive the piece of broadcast. In order words, one or more broadcast receiver needs to receive the piece of broadcast. Therefore, one or more piece of identifier information of application (also referred to as identifier information of broadcast receiver) of the application that needs to receive this broadcast may be determined in accordance with the broadcast type and the broadcast subscription information.

The foresaid broadcast subscription information may be stored in the broadcast center in the form of table or database and should contain a correspondence relation between the broadcast type and the identifier information of application, such that the identifier information of all the applications that need to receive the broadcast of this type may be searched out from the broadcast subscription information in accordance with the broadcast type of the broadcast. The operation at this step may be executed by the broadcast center. For example, after extracting the broadcast from the broadcast queue and determining the broadcast type of the broadcast in accordance with the information contained in the broadcast, the ProcessNextBroadCast( ) function in the AMS may search the broadcast subscription information by using the broadcast type, so as to determine the identifier information of all the applications that need to receive this broadcast.

The foresaid identifier information of application could be a package name of application or any other information able to uniquely identifying the application.

S130, determining whether the determined identifier information of the application matches preset identifier information of the application in a broadcast interception information set and determining whether the determined broadcast type of broadcast matches a broadcast filtering type preset for the application, wherein when it is determined that the determined identifier information of the application matches preset identifier information of the application in a broadcast interception information set and the determined broadcast type of the broadcast matches broadcast filtering type preset for the application, go to S140, otherwise when it is determined that the determined identifier information of application does not match the identifier information of application in the preset broadcast interception information set, or, the determined broadcast type of broadcast does not match the broadcast filtering type preset for the application, go to S150.

In particular, the broadcast interception information set in this embodiment generally contains one or more piece of identifier information of application (for example, package name of application). A case where the broadcast interception information set is null indicates that all the applications in the intelligent device do not need for the broadcast interception in the manner according to this embodiment.

The identifier information of application in the broadcast interception information set may indicate that there are broadcasts that need to be intercepted for one or more designated application.

The foresaid broadcast filtering type could be embodied in the form of broadcast type filter, which means that a respective broadcast type filter may be set for each of applications that need to perform the broadcast interception. All the broadcast types that an application needs to intercept may be embodied by the broadcast type filter corresponding to the application.

The identifier information of application and the broadcast type filter in the broadcast interception information set may be set by the user in accordance with the actual demand. As a specific example, the intelligent device is provided with a security management application; the user selects a broadcast interception option in the security management application when the security management application is kept in the operating state, such that the security management application display a broadcast interception window for the user; the user may set the identifier information of application and the broadcast type filter in the broadcast interception information set through the broadcast interception window. For example, the broadcast interception window may contain icons of applications in the intelligent device, and each of icons corresponds to at least one broadcast type (such as, startup type or network connection type) option; the user checks a corresponding application icon and checks one or more broadcast type corresponding to the application icon; after the user clicks an interception confirmation button, the security management application receives the broadcast interception policy information; the security management application generates a corresponding package name of application and a broadcast type filter in accordance with the received broadcast interception policy information and adds a package identifier to the broadcast interception information set.

The identifier information of application and the broadcast type filter in the broadcast interception information set could also be a default setting. As a specific example, the intelligent device is provided with a security management application; when the security management application is installed, it may automatically set the broadcast interception information set at the framework layer, set the identifier information of one or more application in the broadcast interception information set, and set the corresponding broadcast type filter for the respective application. The identifier information of application added to and the broadcast type filter set in the broadcast interception information set by the security management application are generally directed to the known malicious applications.

The operation at this step may be executed by the broadcast center. For example, the ProcessNextBroadCast( ) function in the AMS may invoke a broadcast interception policy query function (i.e., isIntentBlockedForPkg( ) function) after extracting the broadcast from the broadcast queue, determining the broadcast type of the broadcast in accordance with information contained in this broadcast and searching the broadcast subscription information by using the broadcast type to determine the identifier information of all the applications that need to receive this broadcast. In the process of invoking the broadcast interception policy query function, the ProcessNextBroadCast( ) function may provide the isIntentBlockedForPkg( ) function with the determined identifier information of application and the broadcast type filter as input parameters of the function. The isIntentBlockedForPkg( ) function may execute the preset operations of determining whether the matched identifier information of application is in the broadcast interception information set and determining whether the determined broadcast type matches the broadcast type shown in the broadcast type filter.

It should be explained, if it is determined that there are pieces of identifier information of the application that needs to receive the broadcast at S120, then the matching operation will be made for the identifier information of each application that needs to receive the broadcast, respectively, at this step.

S140, prohibiting sending the broadcast to the broadcast receiver of the application that needs to receive the broadcast.

In particular, the broadcast center will no longer send the broadcast to the broadcast receiver of the relevant application following the current broadcast processing flow. As a specific example, the isIntentBlockedForPkg( ) function may return matching result information generated in the matching operations to the ProcessNextBroadCast( ) function. The returned matching result information may contain the identifier information of application, or contain the identifier information of application and the broadcast type. The ProcessNextBroadCast( ) function will no longer send the foresaid broadcast extracted from broadcast queue to the respective broadcast receiver of application in accordance with the identifier information of application in the matching result information after receiving the returned matching result information by the isIntentBlockedForPkg( ) function.

It should be explained, if it is determined that there are pieces of identifier information of the application that needs to receive the broadcast at S120 while it is determined that the identifier information of application and the broadcast type are not all matched at S130, then the matching result information returned by the isIntentBlockedForPkg( ) function may merely contain the application identifier information in which the identifier information of application and the broadcast type are all matched; or contain the identifier information of all the application and further indicate information (such as, a matching flag bit) of whether each of applications needs for the broadcast interception.

S150, allowing sending the broadcast to the broadcast receiver of the application that needs to receive the broadcast.

In particular, the broadcast center may send the broadcast to the broadcast receiver of the relevant application following the current broadcast processing flow. As a specific example, the isIntentBlockedForPkg( ) function may return matching result information generated in the matching operations to the ProcessNextBroadCast( ) function. The returned matching result information may contain the identifier information of application in which the identifier information of application and the broadcast type are all matched; or contain the identifier information of application and the broadcast type in which the identifier information of application and the broadcast type are all matched. The ProcessNextBroadCast( ) function may exclude the identifier information of application in the matching result information from the identifier information of the application that needs to receive the broadcast (which is determined at S120) after receiving the matching result information returned by the isIntentBlockedForPkg( ) function, and then it may send the foresaid broadcast extracted from the broadcast queue to the broadcast receiver of the corresponding application in accordance with the identifier information of remaining application.

It should be explained, if it is determined that the identifier information of all the application and the broadcast type are not matched at the same time at S130, then the matching result information returned by the isIntentBlockedForPkg( ) function could be null. At this point, the ProcessNextBroadCast( ) function should send the foresaid broadcast extracted from the broadcast queue to the broadcast receiver of the respective application in accordance with the identifier information of the application that needs to receive the broadcast (which is determined at S120).

The second embodiment is directed to a broadcast interception method based on Android. Hereinafter the method will be described in detail with reference to FIG. 2.

Figure 2:
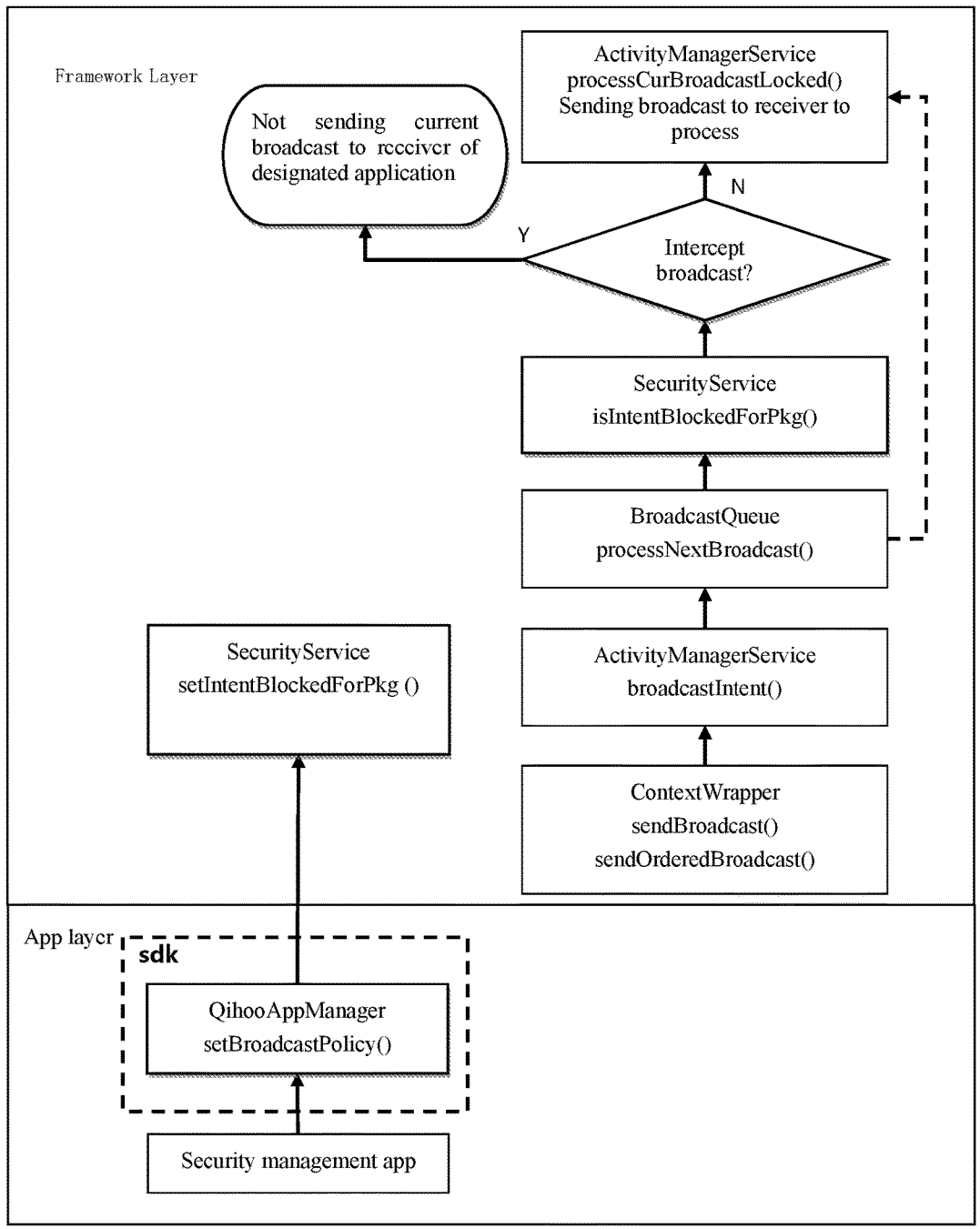
FIG. 2 illustrates a flow chart of a broadcast interception method for intelligent device according to a second embodiment of the disclosure.

As seen from FIG. 2, in this embodiment, the broadcast interception is realized on the ground of an application layer (i.e., app layer in FIG. 2) and a framework layer.

At application layer, a security management application (also referred to as security software) may define functions by means of SDK (Software Development Kit).

In this embodiment, the functions defined at the application layer are shown in Table 1 as follows.

TABLE 1

Class
QihooAppManager
Method (i.e., Function)
Boolean  setBroadcastPolicy (String packageName, IntentFilter intentFilter)
For an application having a package name of packageName, prohibit it receiving a broadcast whose broadcast type matches a broadcast type shown by intentFilter (broadcast type filter); if the intentFilter is set to be null, then indicate that the broadcast type filter of the application having the package name of packageName.

This embodiment, at the Framework layer, additionally defines a service named SecurityService (the service could be a system service), which provides following two functions:

For a designated application, setting it to intercept the receipt of broadcasts of a designated broadcast type This function can be invoked by the foresaid setBroadcastPolicy( ) function, mainly for setting the package name of the corresponding application in the broadcast interception information set in accordance with the broadcast interception policy information inputted by the user and for setting the broadcast type filter for the corresponding application;

public boolean setIntentBlockedForPkg (String packageName, IntentFilter intentFilter)

For an application, checking whether it needs for broadcast interception public boolean isIntentBlockedForPkg (String packageName, Intent intent)

In above two functions, the packageName is a package name corresponding to the application, the intentFilter is a broadcast type filter which can indicate the broadcast type that needs for the broadcast interception, and the intent is a broadcast type of the broadcast that needs to send to the broadcast receiver of the application.

In the flow as shown in FIG. 2, the security management application at the application layer may invoke the setBroadcastPolicy( ) function in QihooAppManager to set broadcast interception information at the framework layer (i.e., the setBroadcastPolicy( ) function may invoke the setIntentBlockedForPkg( ) function at the framework layer), and provide the setBroadcastPolicy( ) function with a package name of the application that needs for broadcast interception and a broadcast type filter. The setBroadcastPolicy( ) function may set the package name into the broadcast interception information set and set the broadcast type filter for the package name.

Subsequently, the operating system may invoke the sendBroadcast( ) function or the sendOrderedBroadcast( ) function to send the broadcast. The sendBroadcast( ) function or the sendOrderedBroadcast( ) function may invoke the broadcastIntent( ) function in the activity management service, and the broadcastIntent( ) function may invoke the processNextBroadcast( ) in the broadcast queue. In the prior art, after extracting a piece of broadcast from the broadcast queue, the processNextBroadcast( ) function may directly process and send the broadcast (as shown by the dashed lines on the right side in FIG. 2); in this embodiment, however, after extracting a piece of broadcast from the broadcast queue, the processNextBroadcast( ) function may invoke the isIntentBlockedForPkg( ) function in the security service, the isIntentBlockedForPkg( ) function may determine whether one or more application needs for the broadcast interception, and the processNextBroadcast( ) function may determine whether to send the extracted broadcast to the corresponding broadcast receiver of the application in accordance with the determining result of the isIntentBlockedForPkg( ) function. For example, when there is need to send the extracted broadcast to the corresponding broadcast receiver, the processNextBroadcast( ) function may invoke the processCurBroadcastLocked( ) function in the activity management service.

The third embodiment is directed to a broadcast interception apparatus for intelligent device. Hereinafter the apparatus will be described in detail with reference to FIG. 3.

Figure 3:
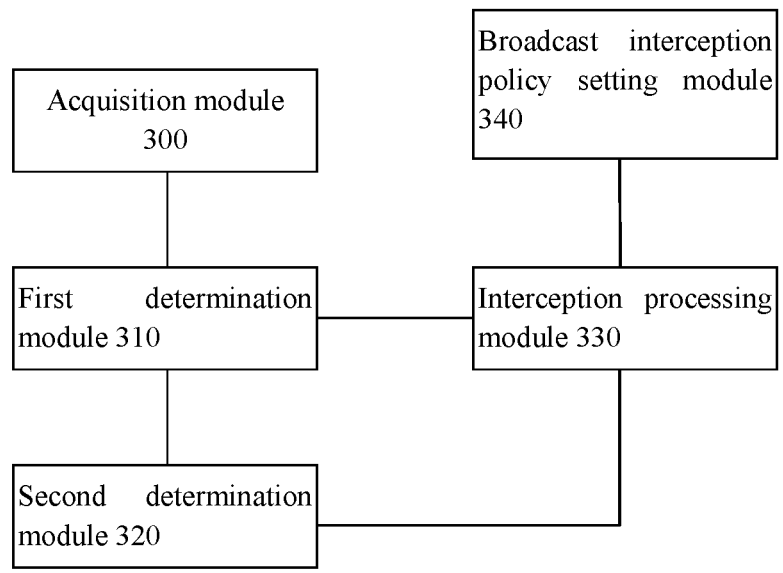
FIG. 3 illustrates a block diagram of a broadcast interception apparatus for intelligent device according to a third embodiment of the disclosure.

The apparatus as shown in FIG. 3 may be applied to an intelligent device (especially, an intelligent mobile device). For example, it is applied to the intelligent mobile device such as intelligent mobile phone or tablet PC. The intelligent device in this embodiment could be an intelligent device based on Android operating system. Of course, if there is another operating system having a similar structure to that of Android operating system, then the intelligent device in this embodiment could also be the intelligent device based on this operating system having the similar structure. Hereinafter this embodiment will be explained by way of Android operating system.

The apparatus as shown in FIG. 3 is located in a framework layer and may include: an acquisition module 300, a first determination module 310, a second determination module 320 and an interception processing module 330, wherein the first determination module 310 is in connection with the acquisition module 300 and the second determination module 320, respectively, and the first determination module 310 and the second determination module 320 are in connection with the interception processing module 330, respectively. In addition, the apparatus may further include a broadcast interception policy setting module 340, which is located in the framework layer and the application layer and which is in connection with the interception processing module 330.

The acquisition module 300 is substantially configured to acquire a broadcast that a broadcast center needs to send to a broadcast receiver of an application.

In particular, the acquisition module 300 may be located in a processing next broadcast function (i.e., ProcessNextBroadCast( ) function) in the AMS. For example, the acquisition module 300 in the ProcessNextBroadCast( ) function extract a piece of broadcast from a broadcast queue (BroadCastQueue) of the broadcast center. The extracted piece of broadcast is the aforesaid broadcast that needs to send to the broadcast receiver of the application.

The first determination module 310 is substantially configured to determine a broadcast type of the broadcast according to information contained in the broadcast.

In particular, since the broadcast generally contains information in relation to a broadcast type, the first determination module 310 may correctly determine the broadcast type of this broadcast by the information contained in the broadcast.

The first determination module 310 may be located in the processing next broadcast function (i.e., ProcessNextBroadCast( ) function) in the AMS. For example, the first determination module 310 in the ProcessNextBroadCast( ) function in the AMS may determine the broadcast type of this broadcast in accordance with the information contained in the broadcast extracted from the broadcast queue by the acquisition module 300.

The second determination module 320 is substantially configured to determine, according to the determined broadcast type by the first determination module 310 and broadcast subscription information, identifier information of the application that needs to receive the broadcast.

In particular, for one piece of broadcast, one or more application needs to receive the piece of broadcast. In order words, one or more broadcast receiver needs to receive the piece of broadcast. Therefore, one or more piece of identifier information of application (also referred to as identifier information of broadcast receiver) of the application that needs to receive this broadcast may be determined in accordance with the broadcast type and the broadcast subscription information by the second determination module 320.

The foresaid broadcast subscription information may be stored in the broadcast center in the form of table or database and should contain a correspondence relation between the broadcast type and the identifier information of application, such that the second determination module 320 may search out the identifier information of all the applications that need to receive the broadcast of this type from the broadcast subscription information in accordance with the broadcast type of the broadcast.

The second determination module 320 may be located in the processing next broadcast function (i.e., ProcessNextBroadCast( ) function) in the AMS. For example, after the acquisition module 300 in the ProcessNextBroadCast( ) function in the AMS extracts the broadcast from the broadcast queue and the first determination module 310 determines the broadcast type of the broadcast in accordance with the information contained in the broadcast, the second determination module 320 may search the broadcast subscription information by using the broadcast type, so as to determine the identifier information of all the applications that need to receive this broadcast.

The foresaid identifier information of application could be a package name of application or any other information able to uniquely identifying the application.

The interception processing module 330 is substantially configured to, if it is determined that the identifier information of the application determined by the second determination module 320 matches preset identifier information of the application in a broadcast interception information set and the broadcast type determined by the first determination module 310 matches a broadcast filtering type preset for the application, prohibit sending the broadcast to the broadcast receiver of application, otherwise allowing sending the broadcast to the broadcast receiver of application.

In particular, the foresaid broadcast filtering type could be embodied in the form of broadcast type filter, which means that a respective broadcast type filter may be set for each of applications that need to perform the broadcast interception. All the broadcast types that an application needs to intercept may be embodied by the broadcast type filter corresponding to the application.

The interception processing module 330 may be located in a processing next broadcast function (i.e., ProcessNextBroadCast( ) function) in the AMS. For example, after the acquisition module 300 in the ProcessNextBroadCast( ) function in the AMS extracts the broadcast from the broadcast queue, the first determination module 310 determines the broadcast type of the broadcast in accordance with information contained in this broadcast and the second determination module 320 searches the broadcast subscription information by using the broadcast type to determine the identifier information of all the applications that need to receive this broadcast, the interception processing module 330 may invoke a broadcast interception policy query function (i.e., isIntentBlockedForPkg( ) function). In the process of invoking the broadcast interception policy query function, the ProcessNextBroadCast( ) function may provide an isIntentBlockedForPkg( ) function (this function pertains to the interception processing module 330) with the identifier information of application and the broadcast type filter as input parameters of the function. The isIntentBlockedForPkg( ) function may execute the preset operations of determining whether the matched identifier information of application is in the broadcast interception information set and determining whether the determined broadcast type matches the broadcast type shown in the broadcast type filter.

In the case of prohibiting sending the broadcast to the broadcast receiver of the application that needs to receive the broadcast, the broadcast center will no longer send the broadcast to the broadcast receiver of the relevant application following the current broadcast processing flow. As a specific example, the isIntentBlockedForPkg( ) function may return matching result information generated in the matching operations to the ProcessNextBroadCast( ) function. The interception processing module 330 in the ProcessNextBroadCast( ) function will no longer send the foresaid broadcast extracted from broadcast queue to the respective broadcast receiver of application in accordance with the identifier information of application in the matching result information after receiving the returned matching result information by the isIntentBlockedForPkg( ) function.

In the case of allowing sending the broadcast to the broadcast receiver of the application that needs to receive the broadcast, the broadcast center may send the broadcast to the broadcast receiver of the relevant application following the current broadcast processing flow. As a specific example, the isIntentBlockedForPkg( ) function may return matching result information generated in the matching operations to the ProcessNextBroadCast( ) function. The interception processing module 330 in the ProcessNextBroadCast( ) function may exclude the identifier information of application in the matching result information from the identifier information of the application that needs to receive the broadcast (which is determined by the second determination module 320) after receiving the matching result information returned by the isIntentBlockedForPkg( ) function, and then it may send the foresaid broadcast extracted from the broadcast queue to the broadcast receiver of the corresponding application in accordance with the identifier information of remaining application.

The broadcast interception policy setting module 340 is substantially configured to receive broadcast interception policy information inputted by a user, to set the identifier information of application in a broadcast interception information set in accordance with the broadcast interception policy information, and to set a broadcast type filter for the application in accordance with the broadcast interception policy information.

The broadcast interception policy setting module 340 may substantially include: a setting broadcast interception policy function located in the application layer and a setting broadcast interception policy function for security service located in the framework layer. Operations executed by the two functions are the same as described in the first embodiment, repeated description of which will be omitted herein.

Algorithm and display provided herein are not inherently related to a particular computer, virtual system or other equipment. Various general systems may also be used with the teaching based on the disclosure. According to the above description, the required structure for constructing such a system is obvious. In addition, the disclosure is not directed to any specific programming language. It should be understood that a variety of programming languages can be used to implement the disclosed contents as described herein and above description to the specific programming language is used to disclose the best inventive implementation mode.

Many details are discussed in the specification provided herein. However, it should be understood that the embodiments of the disclosure can be implemented without these specific details. In some examples, the well-known methods, structures and technologies are not shown in detail so as to avoid an unclear understanding of the description.

Similarly, it should be understood that, in order to simplify the disclosure and to facilitate the understanding of one or more of various aspects thereof, in the above description of the exemplary embodiments of the disclosure, various features of the disclosure may sometimes be grouped together into a single embodiment, accompanying figure or description thereof. However, the method of this disclosure should not be constructed as follows: the disclosure for which the protection is sought claims more features than those explicitly disclosed in each of claims. More specifically, as reflected in the following claims, the inventive aspect is in that the features therein are less than all features of a single embodiment as disclosed above. Therefore, claims following specific embodiments are definitely incorporated into the specific embodiments, wherein each of claims can be considered as a separate embodiment of the disclosure.

It should be understood by those skilled in the art that modules of the apparatus in the embodiments can be adaptively modified and arranged in one or more apparatuses different from the embodiment. Modules in the embodiment can be combined into one module, unit or component, and also can be divided into more sub-modules, sub-units or sub-components. Except that at least some of features and/or processes or modules are mutually exclusive, various combinations can be used to combine all the features disclosed in specification (including appended claims, abstract and accompanying figures) and all the processes or units of any methods or devices as disclosed herein. Unless otherwise definitely stated, each of features disclosed in specification (including appended claims, abstract and accompanying figures) may be taken place with an alternative feature having same, equivalent or similar purpose.

In addition, it should be understood by those skilled in the art, although some embodiments as discussed herein comprise some features included in other embodiment rather than other feature, combination of features in different embodiment means that the combination is within a scope of the disclosure and forms the different embodiment. For example, in the claims, any one of the embodiments for which the protection is sought can be used in any combined manners.

Each of components according to the embodiments of the disclosure can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the components in the broadcast interception apparatus based on Android according to the embodiments of the disclosure. The disclosure may further be implemented as device program (for example, computer program and computer program product) for executing some or all of the methods as described herein. Such program for implementing the disclosure may be stored in the computer readable medium, or have a form of one or more signals. Such a signal may be downloaded from the Internet websites, or be provided in carrier, or be provided in other manners.

It should be noted that the above-described embodiments are intended to illustrate but not to limit the disclosure, and alternative embodiments can be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

Figure 4:
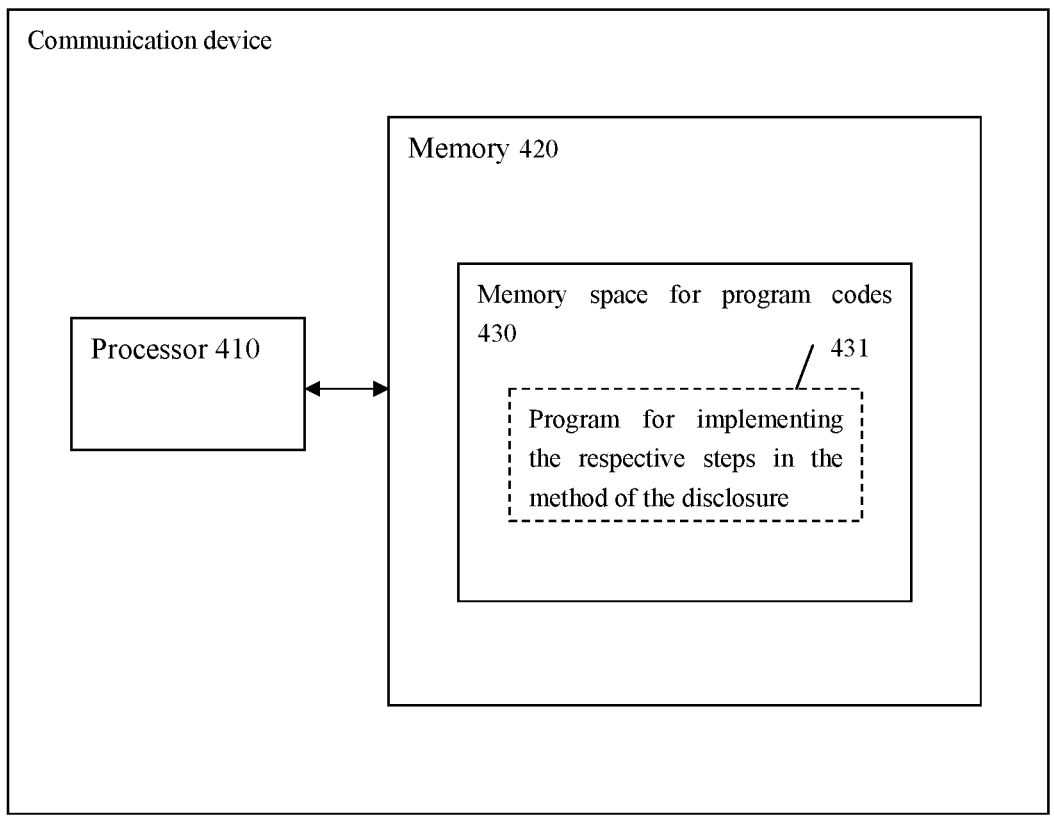
FIG. 4 illustrates a block diagram of a communication device for executing the methods according the disclosure.
Figure 5:
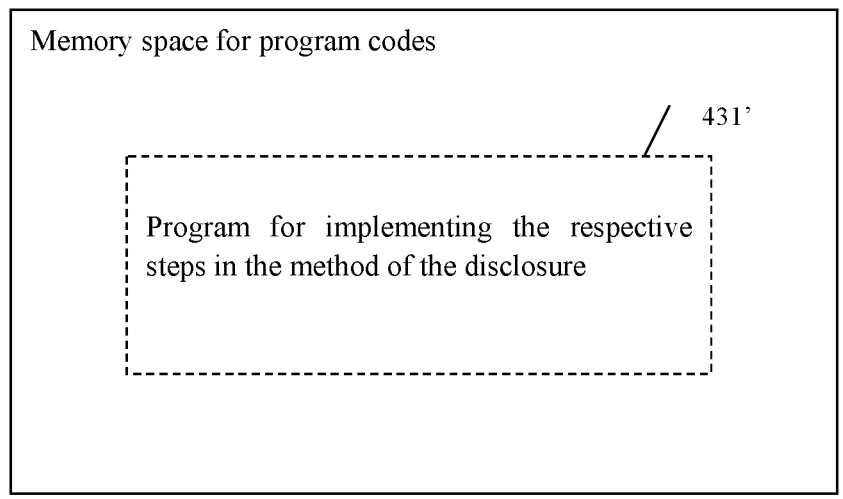
FIG. 5 illustrates a schematic diagram of a memory cell which is used to store and carry program codes for realizing the methods according to the disclosure.

For example, FIG. 4 illustrates the communication device which may implement the broadcast interception method for intelligent device according to this disclosure. Traditionally, the communication device includes a processor 410 and a computer program product or a computer readable medium in form of a memory 420. The memory 420 could be electronic memories such as flash memory, EEPROM (Electrically Erasable Programmable Read-Only Memory), EPROM, hard disk or ROM. The memory 420 has a memory space 430 for executing program codes 431 of any steps in the above methods. For example, the memory space 430 for program codes may include respective program codes 431 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 5. The memory cells may be provided with memory sections, memory spaces, etc., similar to the memory 420 of the communication device as shown in FIG. 4. The program codes may be compressed for example in an appropriate form. Usually, the memory cell includes a program 431' for executing the method steps according to the disclosure, which could be codes readable for example by processors 410. When these codes are operated on the communication device, the communication device may execute respective steps in the method as described above.

It should be noted that the above-described embodiments are intended to illustrate but not to limit the disclosure, and alternative embodiments can be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

What is claimed is:

1. A broadcast interception method for intelligent device, comprising:
   in a framework layer, acquiring a broadcast that a broadcast center needs to send to a broadcast receiver of an application;
   determining a broadcast type of the broadcast according to information contained in the broadcast;
   determining, according to the determined broadcast type and broadcast subscription information, identifier information of the application that needs to receive the broadcast; and
   when it is determined that the identifier information of the application matches preset identifier information of the application in a broadcast interception information set and the determined broadcast type of the broadcast matches broadcast filtering type preset for the application, prohibiting sending the broadcast to the broadcast receiver of the application, otherwise, allowing sending the broadcast to the broadcast receiver of the application.

2. The method according to claim 1, wherein the broadcast filtering type is embodied in the form of broadcast type filter.

3. The method according to claim 2, further comprising:
   receiving broadcast interception policy information input by a user, setting the identifier information of the application in the broadcast interception information set in accordance with the broadcast interception policy information, and setting the broadcast type filter for the application in accordance with the broadcast interception policy information.

4. The method according to claim 3, wherein a setting broadcast interception policy function is located in an application layer and a setting broadcast interception policy function for security service is located in the framework layer;
   the step of receiving broadcast interception policy information input by a user, setting the identifier information of the application in the broadcast interception information set in accordance with the broadcast interception policy information, and setting the broadcast type filter for the application in accordance with the broadcast interception policy information, comprises:
receiving the broadcast interception policy information input by a user by the setting broadcast interception policy function in the application layer, and invoking the setting broadcast interception policy function in the framework layer to transfer a package name of the application and the broadcast type filter to the setting broadcast interception policy function in the framework layer; and
setting the package name into the broadcast interception information set by the setting broadcast interception policy function in the framework layer, and setting the broadcast type filter for the application in the framework layer.

5. The method according to claim 1, wherein the step of acquiring a broadcast that a broadcast center needs to send to a broadcast receiver of an application comprises:
extracting one piece of broadcast from a broadcast queue of the broadcast center.

6. The method according to claim 5, wherein the step of extracting one piece of broadcast from a broadcast queue of the broadcast center comprises:
extracting one piece of broadcast from the broadcast queue of the broadcast center by a processing next broadcast function in the framework layer,
the processing next broadcast function is further configured for: determining the broadcast type of the broadcast in accordance with information contained in the broadcast, determining the identifier information of the application that needs to receive the broadcast in accordance with the broadcast type and broadcast subscription information, invoking a broadcast interception policy query function, and providing the broadcast interception policy query function with the identifier information of the application and the broadcast type.

7. The method according to claim 6, wherein the broadcast interception policy query function is particularly configured for: determining whether the identifier information of the application matches the identifier information of the application in the preset broadcast interception information set and whether the broadcast type of the broadcast matches the broadcast filtering type preset for the application, and returning determining result to the processing next broadcast function.

8. The method according to claim 7, wherein the processing next broadcast function is further particularly configured for: performing a relevant broadcast sending process for information that does not need for the broadcast interception and that returned by the broadcast interception policy query function, and not performing the relevant broadcast sending process for information that needs for the broadcast interception and that returned by the broadcast interception policy query function.

9. The method according to claim 1, wherein the intelligent device is an intelligent device based on Android operating system.

10. The method according to claim 1, wherein the broadcast subscription information is broadcast subscription information generated when the application registers the broadcast receiver.

11. The method according to claim 1, wherein the broadcast type comprises a startup type or a network connection type.

12. An intelligent device for broadcast interception, comprising:
a memory having instructions stored thereon;
a processor configured to execute the instructions to perform operations for broadcast interception, comprising:
acquiring a broadcast that a broadcast center needs to send to a broadcast receiver of an application;
determining a broadcast type of the broadcast according to information contained in the broadcast;
according to the broadcast type and broadcast subscription information, determining identifier information of the application that needs to receive the broadcast; and
when it is determined that the identifier information of the application matches preset identifier information of the application in a broadcast interception information set and the broadcast type of the broadcast matches a broadcast filtering type preset for the application, prohibiting sending the broadcast to the broadcast receiver of application, otherwise allowing sending the broadcast to the broadcast receiver of application.

13. The intelligent device according to claim 12, wherein the processor is further configured to perform:
receiving broadcast interception policy information input by a user, setting the identifier information of the application in the broadcast interception information set in accordance with the broadcast interception policy information, and setting the broadcast type filter for the application in accordance with the broadcast interception policy information.

14. The intelligent device according to claim 13, wherein a setting broadcast interception policy function is located in an application layer and a setting broadcast interception policy function for security service is located in the framework layer;
the receiving broadcast interception policy information input by a user, setting the identifier information of the application in the broadcast interception information set in accordance with the broadcast interception policy information, and setting the broadcast type filter for the application in accordance with the broadcast interception policy information, comprises:
receiving the broadcast interception policy information input by a user by the setting broadcast interception policy function in the application layer, and invoking the setting broadcast interception policy function in the framework layer to transfer a package name of the application and the broadcast type filter to the setting broadcast interception policy function in the framework layer; and
setting the package name into the broadcast interception information set by the setting broadcast interception policy function in the framework layer, and setting the broadcast type filter for the application in the framework layer.

15. The intelligent device according to claim 12, wherein the acquiring a broadcast that a broadcast center needs to send to a broadcast receiver of an application comprises:
extracting one piece of broadcast from a broadcast queue of the broadcast center.

16. The intelligent device according to claim 15, wherein the extracting one piece of broadcast from the broadcast queue of the broadcast center comprises:
extracting one piece of broadcast from the broadcast queue of the broadcast center by a processing next broadcast function in the framework layer;
the processing next broadcast function is further configured for determining the broadcast type of the broadcast in accordance with information contained in the broadcast, determining the identifier information of the application that needs to receive the broadcast in accordance with the broadcast type and broadcast subscription information, invoking a broadcast interception policy query function and providing the broadcast interception policy query function with the identifier information of the application and the broadcast type.

17. The intelligent device according to claim 16, wherein the processor is further configured to perform: determining whether the identifier information of the application matches the identifier information of the application in the preset broadcast interception information set and whether the broadcast type of the broadcast matches the broadcast filtering type preset for the application, and returning determining result to the processing next broadcast function.

18. The intelligent device according to claim 17, wherein the processor is further configured to perform a relevant broadcast sending process for information that does not need for the broadcast interception and that returned by the broadcast interception policy query function, and not to perform the relevant broadcast sending process for information that needs for the broadcast interception and that returned by the broadcast interception policy query function.

19. The intelligent device according to claim 12, wherein the broadcast subscription information is broadcast subscription information generated when the application registers the broadcast receiver.

20. A non-transitory computer-readable medium, having computer programs stored thereon that, when executed by one or more processors of an intelligent device, cause the intelligent device to perform:

in a framework layer, acquiring a broadcast that a broadcast center needs to send to a broadcast receiver of an application;

determining a broadcast type of the broadcast according to information contained in the broadcast;

determining, according to the determined broadcast type and broadcast subscription information, identifier information of the application that needs to receive the broadcast; and when it is determined that the identifier information of the application matches preset identifier information of the application in a broadcast interception information set and the determined broadcast type of the broadcast matches broadcast filtering type preset for the application, prohibiting sending the broadcast to the broadcast receiver of the application, otherwise, allowing sending the broadcast to the broadcast receiver of the application.

* * * * *